US009448415B2

(12) United States Patent
Liu

(10) Patent No.: US 9,448,415 B2
(45) Date of Patent: Sep. 20, 2016

(54) SPATIALLY INTERLEAVED POLARIZATION CONVERTER FOR LCOS DISPLAY

(71) Applicant: OmniVision Technologies, Inc., Santa Clara, CA (US)

(72) Inventor: Yi-Wei Liu, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 91 days.

(21) Appl. No.: 14/631,513

(22) Filed: Feb. 25, 2015

(65) Prior Publication Data
US 2016/0246068 A1 Aug. 25, 2016

(51) Int. Cl.
*G02B 27/28* (2006.01)
*G02B 3/00* (2006.01)
*G02B 5/30* (2006.01)
*G03B 21/20* (2006.01)

(52) U.S. Cl.
CPC ........... *G02B 27/285* (2013.01); *G02B 3/0006* (2013.01); *G02B 5/3083* (2013.01); *G03B 21/2073* (2013.01)

(58) Field of Classification Search
CPC G03B 21/006; G03B 21/2073; G03B 27/26; G03B 27/283; G03B 27/285; G03B 27/2214; G02F 2001/13355; G02F 2001/133638; G02B 27/26; G02B 27/283; G02B 27/285; G02B 27/2214
See application file for complete search history.

(56) References Cited

U.S. PATENT DOCUMENTS

| 5,757,547 | A | 5/1998 | Rodman et al. |
| 6,166,792 | A | 12/2000 | Miyawaki et al. |
| 6,310,713 | B2 * | 10/2001 | Doany ............................ 349/11 |
| 6,411,437 | B1 * | 6/2002 | Cannon ................ G02B 27/283 353/20 |
| 7,206,132 | B2 | 4/2007 | Somani et al. |
| 7,905,600 | B2 | 3/2011 | Facius et al. |
| 2013/0063701 | A1 | 3/2013 | Ouderkirk et al. |

OTHER PUBLICATIONS

Imagine Optix PG-PCS Brochure, pulled from http://www.imagineoptix.com/wp-content/themes/imagineoptix/pdfs/GEN3-PG-PCS-Brochure-101211v4.pdf on Jan. 5, 2015, 3 pp.
McManamon, et al., "Optical Phased Array Technology", Proceedings of the IEEE, vol. 84, No. 2, Feb. 1996, 268-298.

(Continued)

Primary Examiner — Sultan Chowdhury
(74) Attorney, Agent, or Firm — Lathrop & Gage LLP

(57) ABSTRACT

An image projector includes a spatially-interleaved polarization converter having an input and output lenslet array, and may transmit light thereon as converted linearly-polarized light. The image projector also includes a lens unit and a projector assembly having a pixel array and being capable of reflecting the converted light. The output lenslet array, the lens unit, and the projector assembly form an imaging system that images the input lenslet array to a top surface of the pixel array. A method for converting light to an output light beam having a single common polarization state includes transmitting the light as a plurality of beamlets each having an s-polarized component and a p-polarized component, splitting each beamlet into a transmitted p-polarized beamlet and a reflected s-polarized beamlet, converting each p-polarized beamlet to a first s-polarized output beamlet, and spatially interleaving the s-polarized beamlets with the first s-polarized output beamlets.

20 Claims, 12 Drawing Sheets

(56) References Cited

OTHER PUBLICATIONS

Nicolás, et al., "Programmable Wave Plates Using a Twisted Nematic Liquid Crystal Display", pulled from: http://opticalengineering.spiedigitallibrary.org/ on Nov. 24, 2014 Terms of Use: http://spiedl.org/terms, Optical Engineering, vol. 41 No. 12, Dec. 2002, 3004-3005.

Liu, et al., "Polarization properties of corner-cube retroreflectors: theory and experiment", Appl. Opt. 36, 1553-1559 (1997), 1553-1559.

Spilman, et al., "Stress birefringent, space-variant wave plates for vortex illumination", Applied Optics, vol. 46, No. 1, Jan. 2007, 61-66.

Voelkel, et al., "Laser Beam Homogenizing: Limitations and Constraints", Optical Systems Design, SPIE Europe, Sep. 2006, 12 pp.

* cited by examiner

SPATIALLY INTERLEAVED POLARIZATION CONVERTER FOR LCOS DISPLAY

BACKGROUND

This invention relates to liquid-crystal-on-silicon (LCOS) displays, and specifically, polarization converters used in LCOS displays.

LCOS displays are used in consumer electronics, such as hand-held projectors and near-eye displays, and also have applications in optical communications technologies. LCOS displays include an LCOS panel that reflects source illumination incident thereon that is generated by an illuminator emitting broad-band visible light. In a hand-held projector that includes an LCOS panel, light reflected by the LCOS panel is transmitted through a projector assembly and projected onto a surface. The utility of such battery-powered LCOS-based devices depends in part on their small size and efficient use of source illumination.

SUMMARY OF THE INVENTION

Spatially-interleaved polarization converters disclosed herein enable battery-powered LCOS devices to efficiently use source illumination while maintaining a small size.

A spatially-interleaved polarization converter has optical elements including an input lenslet array, a first double-pass quarter-wave retarder, a second double-pass quarter-wave retarder, a polarizing beam splitter (PBS), and a wave-retarder array. The input lenslet array has a plurality of input lenslets with parallel respective lens optical axes. The wave-retarder array has a noncontiguous plurality of half-wave retarders with parallel respective retarder optical axes that are parallel to the lens optical axes. The PBS has a planar beam-splitting element located (a) between the input lenslet array and the wave-retarder array and (b) between the first double-pass quarter-wave retarder and the second double-pass quarter-wave retarder. The optical elements are configured to convert an input light beam to an output light beam having a plurality of first s-polarized beamlets interleaved with a plurality of second s-polarized beamlets.

In an embodiment, an image projector includes a spatially-interleaved polarization converter having optical elements including an input lenslet array and an output lenslet array. The image projector is capable of transmitting incident light thereon as converted light having a single common polarization state. The image projector also includes a lens unit and a projector assembly having a pixel array and being capable of reflecting the converted light. The output lenslet array, the lens unit, and the projector assembly form an imaging system that images the input lenslet array to a top surface of the pixel array.

In an embodiment, a method for converting an input light beam having multiple linear polarization states to an output light beam having a single common polarization state. The method includes transmitting the input light beam as a plurality of beamlets each having an s-polarized component and a p-polarized component, splitting each beamlet into a respective transmitted p-polarized beamlet and a respective reflected s-polarized beamlet, converting each transmitted p-polarized beamlet to a respective first s-polarized output beamlet, and spatially interleaving the reflected s-polarized beamlets with the first s-polarized output beamlets, resulting in the output beam.

DETAILED DESCRIPTION

Figure 1:
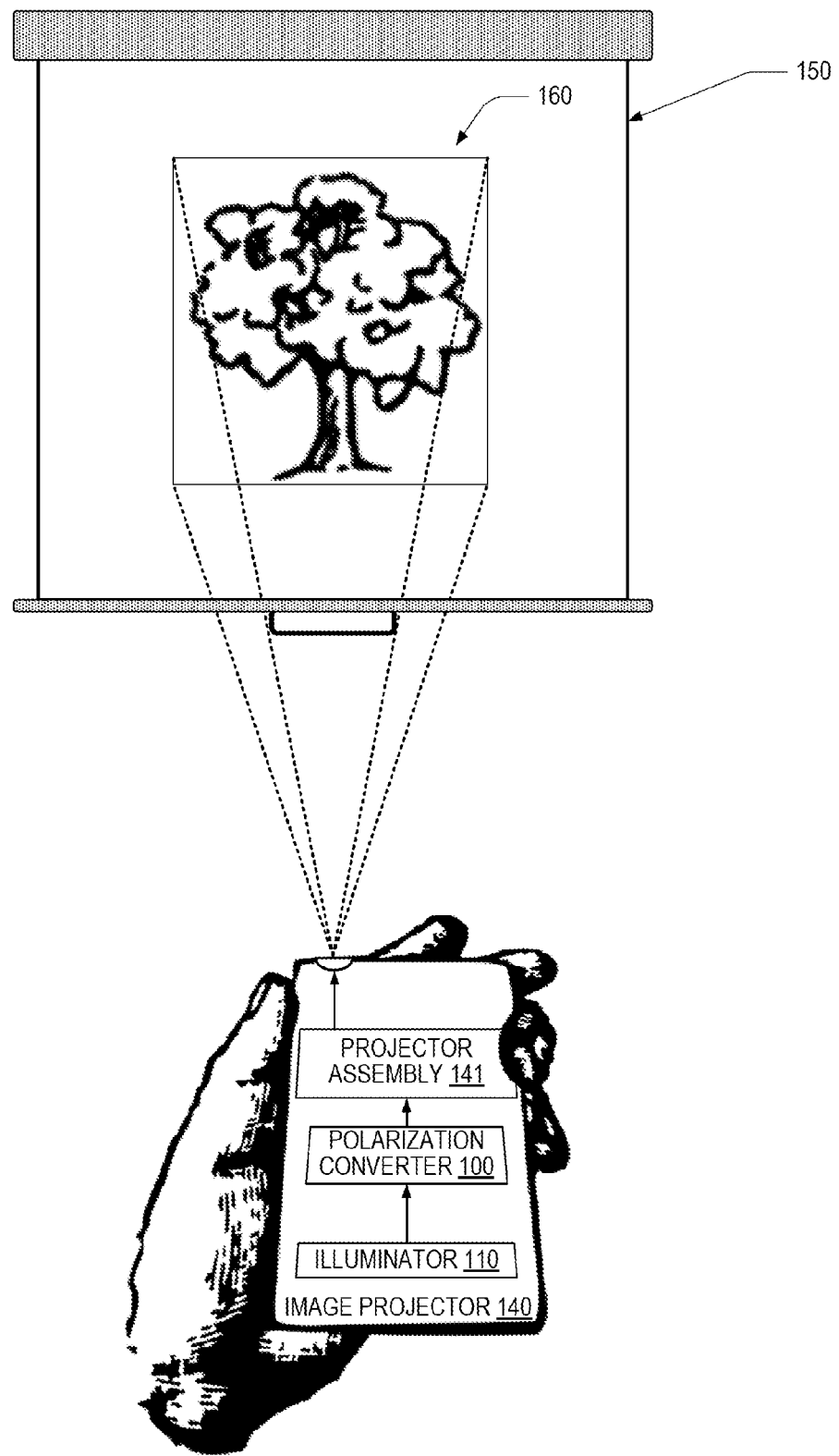
FIG. 1 shows one exemplary use scenario for an illuminator that illuminates a polarization converter and a projector assembly within a hand-held image projector, in an embodiment.

FIG. 1 shows one exemplary use of a polarization converter 100 within a hand-held image projector 140 that projects an image 160 onto a screen 150. An illuminator 110 generates light that is transmitted by polarization converter 100 and projected by a projector assembly 141. Polarization converter 100 may alternately be employed in a different display device, such as in a see-through head-mounted display system.

Figure 2:
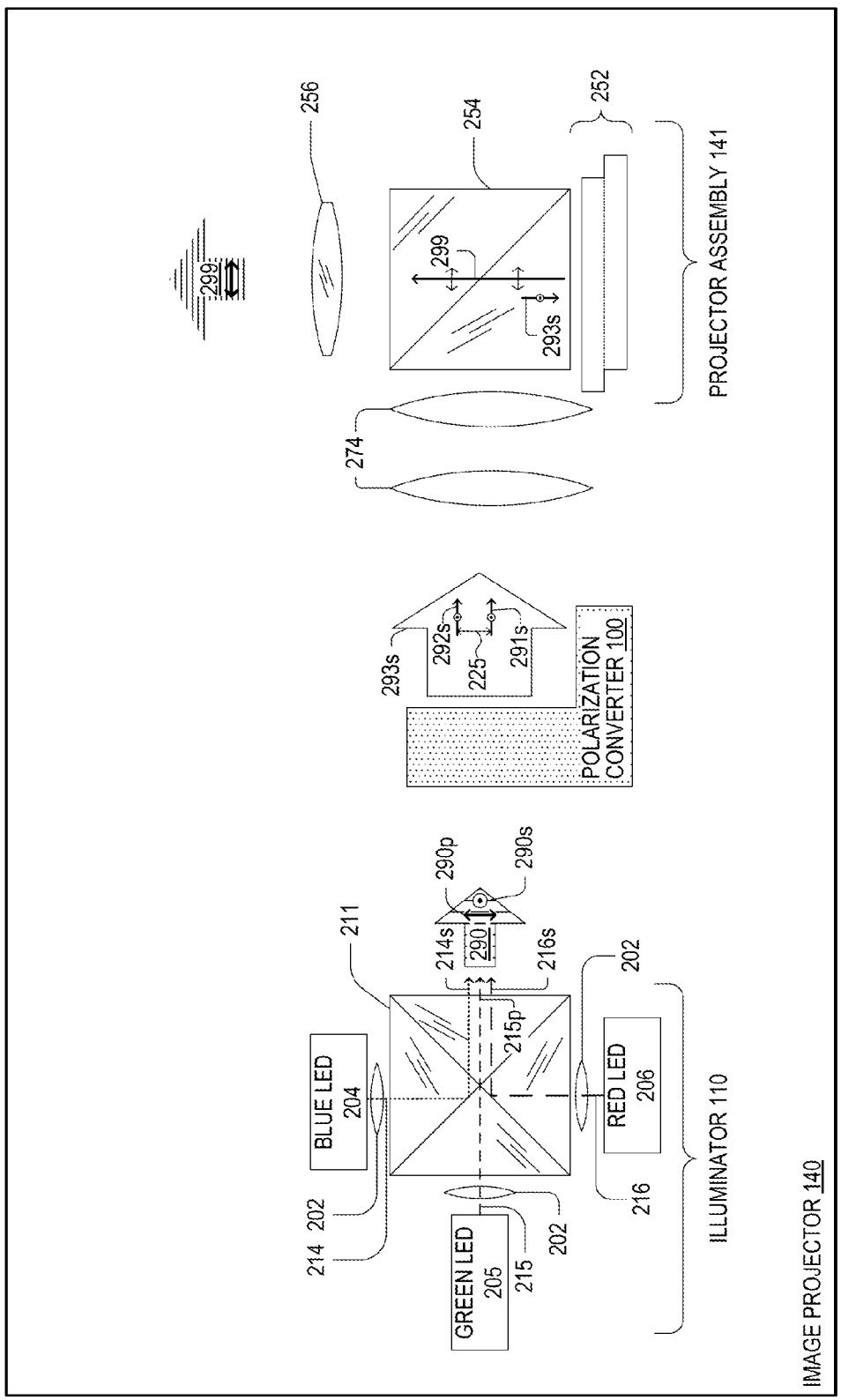
FIG. 2 is a detailed view of the illuminator and projector assembly of the LCOS display of FIG. 1, in an embodiment.

FIG. 2 is a detailed view of polarization converter 100, illuminator 110 and projector assembly 141. In FIG. 2, s-polarization and p-polarization refer to electric field components normal to the figure plane, and parallel to the figure plane, respectively. Projector assembly 141 includes an LCOS panel 252, a polarizing beamsplitter (PBS) cube 254, and a projector lens 256. Image projector 140 may also include condenser lenses 274 between polarization converter 100 and projector assembly 141.

Illuminator 110 includes a color combiner cube 211, a blue LED 204, a green LED 205, and a red LED 206. Blue LED 204, green LED 205, and red LED 206 emit source illumination 214, 215, and 216 respectively that are each collimated by a respective lens 202. Combiner cube 211 reflects illumination 214s and 216s, which are the s-polarized components of illumination 214 and illumination 216, respectively. Combiner cube 211 transmits illumination 215p, which is the p-polarized component of illumination 215. Combiner cube 211 combines illuminations 214s, 215p, and 216s to form a white-light output beam 290, which may include at least one of an s-polarized component 290s and a p-polarized component 290p. Color combiner cube 211 is for example what is known in the art as an "X-cube" or a cross-dichroic prism, commercially available from Nitto Optical Co. Ltd. Different color combiner cubes may be used without departing from the scope hereof.

Output beam 290 is incident upon converter 100 located between illuminator 110 and projector assembly 141. Polarization converter 100 transmits output beam 290 as a converted beam 293s, which includes two s-polarized beams 291s and 292s.

Converted beam 293s propagates through condenser lenses 274 and is incident on PBS cube 254, which reflects only s-polarized light to LCOS panel 252. PBS cube 254 reflects converted beam 293s to LCOS panel 252, which spatially modulates and reflects converted beam 293s as p-polarized output illumination 299 that is transmitted through PBS cube 254 and projected by projector lens 256.

Polarization converter 100 enables efficient use of output beam 290, as without polarization converter 100, p-polarized component 290p does not reach LCOS panel 252 (as PBS cube 254 reflects only s-polarized light) and is not part of output illumination 299. A problem with prior-art polarization converters is that s-polarized beams 291s and 292s are spatially separated, as illustrated by a distance 225, which results in converted beam 293s being wider than incident beam 290. The increased beam width increases a minimum size of projector assembly 141 that can accommodate the widened beam.

Figure 3:
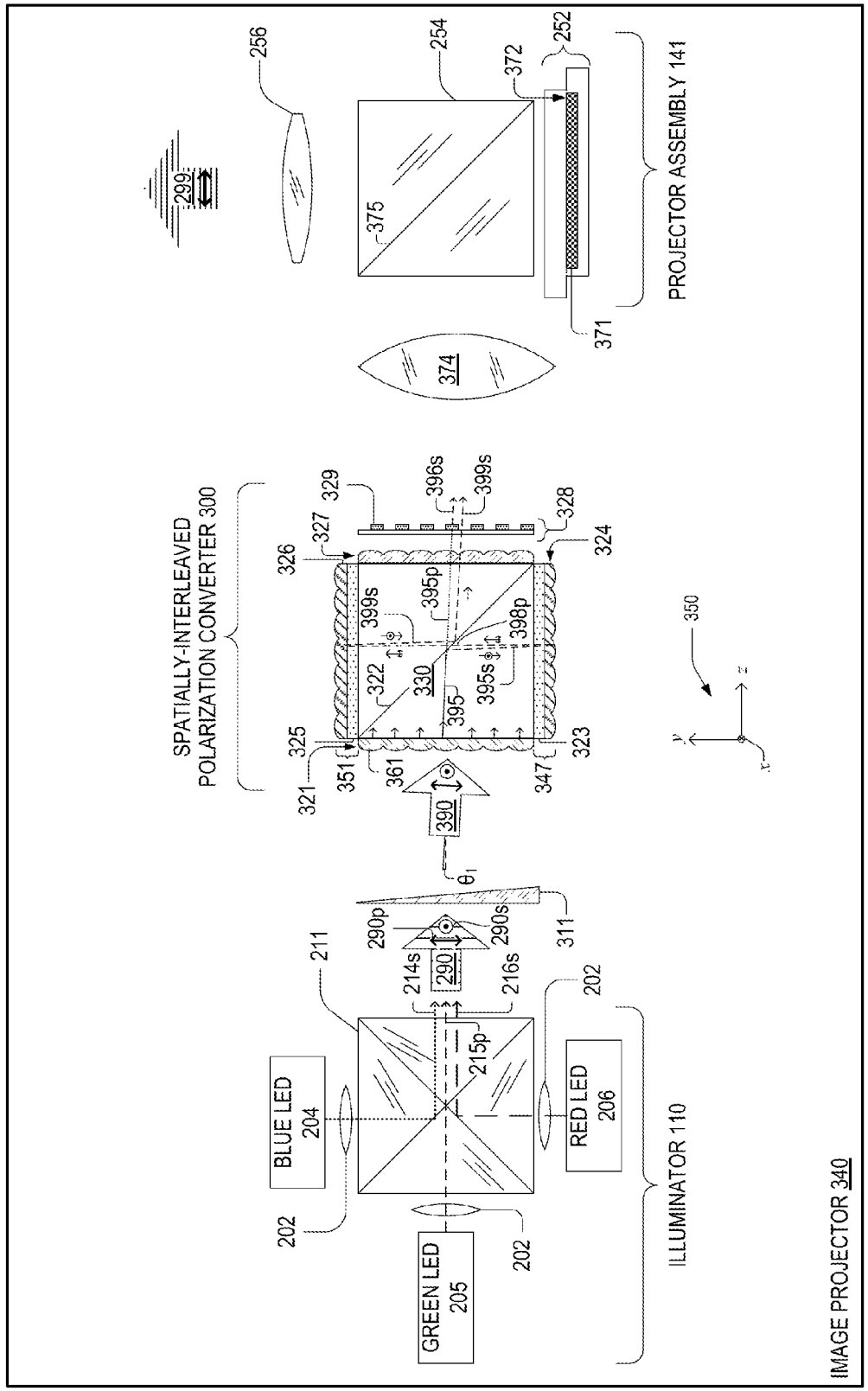
FIG. 3 includes a first illustrative example of spatially-interleaved polarization converter operating within an image projector, in an embodiment.
Figure 4:
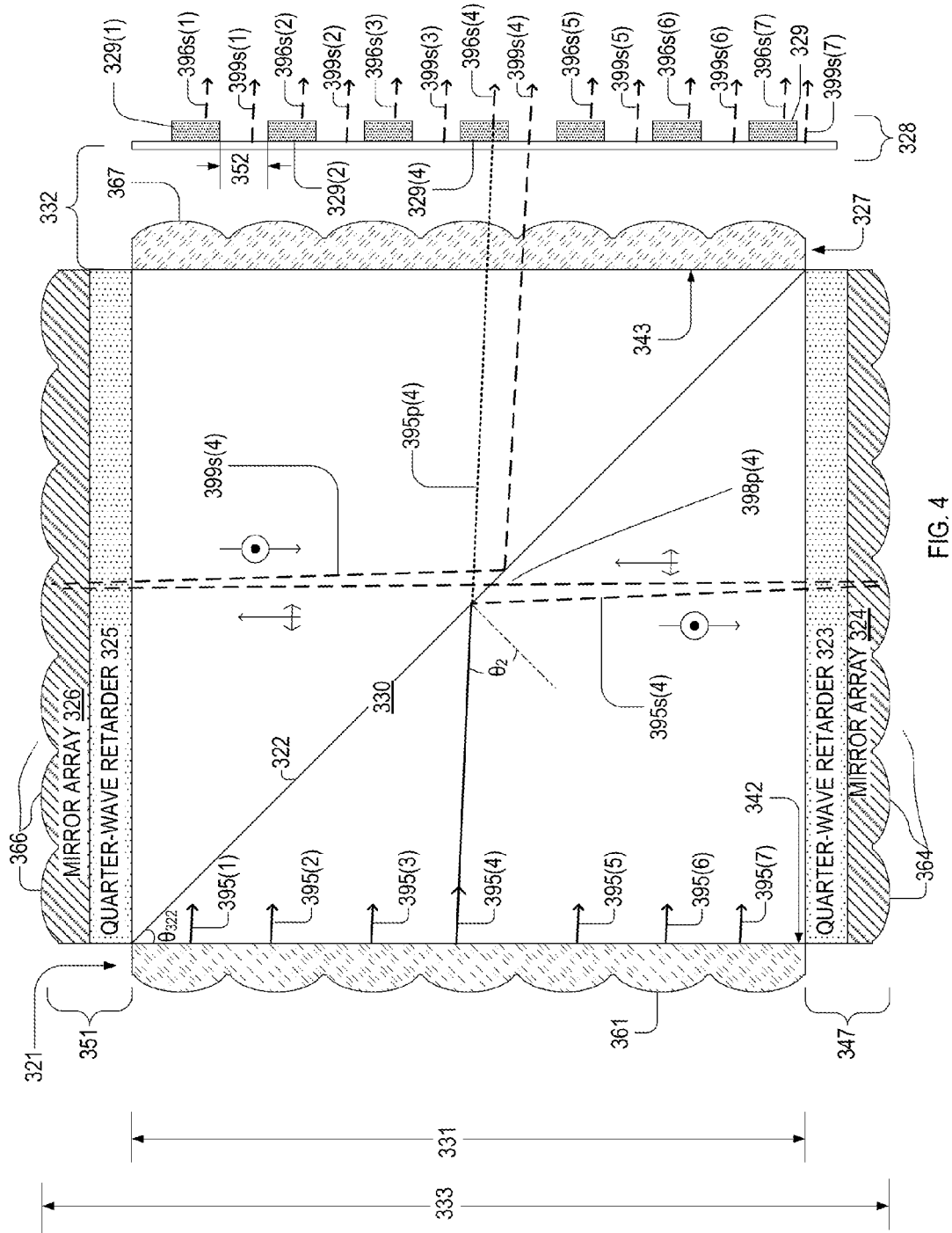
FIG. 4 shows an enlarged view of the polarization converter of FIG. 3.

FIG. 3 includes an illustrative example of spatially-interleaved polarization converter 300 in operation within an image projector 340. FIG. 4 shows an enlarged view of spatially-interleaved polarization converter 300. Image projector 340 and spatially-interleaved polarization converter 300 are embodiments of image projector 140 and polarization converter 100, respectively. Image projector 340 may include a lens unit 374, which may be similar to condenser lenses 274 and may include one or more lenses. FIGS. 3 and 4 are best viewed together in the following description.

Spatially-interleaved polarization converter 300 includes a PBS cube 330, an input lenslet array 321, an output lenslet array 327, quarter-wave retarders 323 and 325, mirror arrays 324 and 326, and a half-wave retarder array 328. PBS cube 330 may be formed of two prisms with a beam-splitting element 322 therebetween. Beam-splitting element 322 is for example a thin-film coating. Quarter-wave retarder 323 and mirror array 324 form a double-pass quarter-wave retarder 347. Quarter-wave retarder 325 and mirror array 326 form a double-pass quarter-wave retarder 351.

The order of optical elements of double-pass quarter-wave retarder 351 may vary without departing from the scope hereof. For example, mirror array 326 may be replaced by a lenslet array similar to input lenslet array 321 and a planar mirror, with quarter-wave retarder 325 therebetween.

Lenslet arrays 321 and 327 are two-dimensional and each include a quantity $N_1=N_x \times N_y$ lenslets 361 and 367, respectively. Lenslets 361 and 367 are arranged in an array with $N_y$ rows and $N_x$ columns, where x and y are directions of coordinate axes 350. Lenslet arrays 321 and 327 may be similar to those used in a Köhler integrator for spatially homogenizing a light source, as described in "Laser Beam Homogenizing: Limitations and Constraints," Proc. SPIE 7102, by Voelke and Weible.

In an embodiment, each input lenslet 361 is at least one of (a) coaxial and (b) confocal with a corresponding output lenslet 367. In a different embodiment, each input lenslet 361 has a free-space focal length such that, when configured within spatially-interleaved polarization converter 300 and given a refractive index of PBS cube 330, each input lenslet 361 focuses incident light in a region 332 between surface 343 of PBS cube 330 and half-wave retarder array 328.

LCOS panel 252 includes a pixel array 371 with a top surface 372. In an embodiment of image projector 340, output lenslet array 327, lens unit 374, and beam-splitting surface 375 are arranged to image input lenslet array 321 on top surface 372. In different embodiment of image projector 340, lens unit 374 is not present, and output lenslet array 327 and beam-splitting surface 375 are arranged to image input lenslet array 321 on top surface 372. Input lenslet array 321 may be imaged to a plane parallel to top surface 372 that intersects LCOS panel 252 without departing from the scope hereof.

Mirror arrays 324 and 326 include a quantity $N_1$ mirrors 364 and 366, respectively. Mirrors 364 and 366 each may be concave mirrors. In an embodiment, each mirror 364 is at least one of (a) coaxial and (b) confocal with a corresponding mirror 366. In a different embodiment, each mirror 364 has a focal length exceeding cube side length 331 and less than a distance 333 between outer surfaces of mirror arrays 324 and 326.

Input lenslet array 321 includes a quantity $N_1$ mutually parallel optical axes each corresponding to one respective lenslet 361. Similarly, lenslet array 327 includes a quantity $N_1$ mutually parallel optical axes each corresponding to one respective lenslet 367. The optical axes of input lenslet array 321 are substantially parallel to the optical axes of output lenslet array 327. Herein, "substantially parallel" denotes that the axes are parallel to within ±5°.

In an embodiment, half-wave retarder array 328 includes at least a quantity $N_y$ half-wave retarders 329 each corresponding to a row of lenses of output lenslet array 327. Half-wave retarders 329 have mutually parallel optical axes that are substantially parallel to optical axes of lenslets 367. Half-wave retarders 329 are noncontiguous, for example, half-wave retarders 329(1) and 329(2) are separated by a gap 352.

In a different embodiment, half-wave retarder array 328 may be formed of a continuous optical element with a spatially-varying birefringence profile. Examples include a Pockels cell, a holographic optical element, or a liquid crystal cell configured to have a spatially-varying birefringence profile with that mimics an array of half-wave plates similar to half-wave retarder array 328.

Input lenslet array 321 transmits an incident beam 390 as a plurality of beamlets 395(1-7) each corresponding to a respective lens of input lenslet array 321. For clarity of illustration, FIGS. 3 and 4 show one of beamlets 395(1-7), beamlet 395(4), propagating through spatially-interleaved polarization converter 300. Beamlets 395 are incident on beam-splitting element 322 at an incident angle $\theta_2 \neq 45°$ with respect to normal, as shown in FIG. 4. Herein, the incident angle of a beamlet with respect to a surface is the incident angle of the beamlet's chief ray with the normal to the surface.

Beam-splitting element 322 intersects surface 342 at an angle $\theta_{312}=45°$ (FIG. 4). Incident angle $\theta_2$ of beamlets 395 results from an incident beam 390 being at non-normal incidence ($\theta_1 \neq 0°$) with respect to a surface 342 of PBS cube 330. In FIG. 3, a wedge prism 311 steers and transmits output beam 290 as incident beam 390 having incident angle $\theta_1$. Alternatively, output beam 290 may be transmitted such that it has incident angle $\theta_1$ with respect to surface 342 by changing the relative orientations of illuminator 110 and spatially-interleaved polarization converter 300. In a different embodiment of spatially-interleaved polarization converter 300, angle $\theta_{322} \neq 45°$ such that incident angle $\theta_2 \neq 45°$ when $\theta_1 = 0°$.

Beamlets 395 each include both an s-polarization component and a p-polarization component. In response to beamlets 395(1-7) incident on beam-splitting element 322, spatially-interleaved polarization converter 300 outputs respective first s-polarized output beamlets 396s(1-7) and second s-polarized output beamlets 399s(1-7), as shown in FIG. 4. For example, s-polarized beamlets 396s(4) and 399s(4) are formed from beamlet 395(4).

Neglecting losses due to absorption and scattering from optical components that constitute spatially-interleaved polarization converter 300, beamlets 396s and 399s collectively include all of the electromagnetic energy of beamlet 395. For clarity of illustration, FIG. 4 illustrates one beamlet 395 transmitted through spatially-interleaved polarization converter 300 and converted to beamlets 396s and 399s.

The following describes how spatially-interleaved polarization converter 300 converts input beamlets 395(1-7) to output beamlets 396s(1-7) and 399s(1-7), input beamlet 395(4) being an illustrative example. Beam-splitting element 322 splits beamlet 395(4) into a p-polarized transmitted beamlet 395p(4), and an s-polarized reflected beamlet 395s(4). P-polarized beamlet 395p(4) propagates through output lenslet array 327 and half-wave retarder 329(4), which rotates the polarization of p-polarized beamlet 395p(4) such that half-wave retarder 329(4) transmits an s-polarized beamlet 396s(4). S-polarized beamlet 395s(4) becomes an intermediate p-polarized beamlet 398p(4) after a double-pass through quarter-wave retarder 347, and a reflection from mirror array 324. Intermediate p-polarized beamlet 398p(4) becomes an s-polarized beamlet 399s(4) after a double-pass through quarter-wave retarder 351, and a reflection from mirror array 326. Beamlet 399s(4) is incident on beam-splitting element 322, which reflects beamlet 399s(4) through output lenslet array 327 and between adjacent half-wave retarders 329. In the embodiment of spatially-interleaved polarization converter 300 shown in FIGS. 3 and 4, $\theta_1 \neq 0°$ such that output beamlets 396s and 399s do not co-propagate, and no output beamlet 399s propagates through any half-wave retarder 329.

Figure 5:
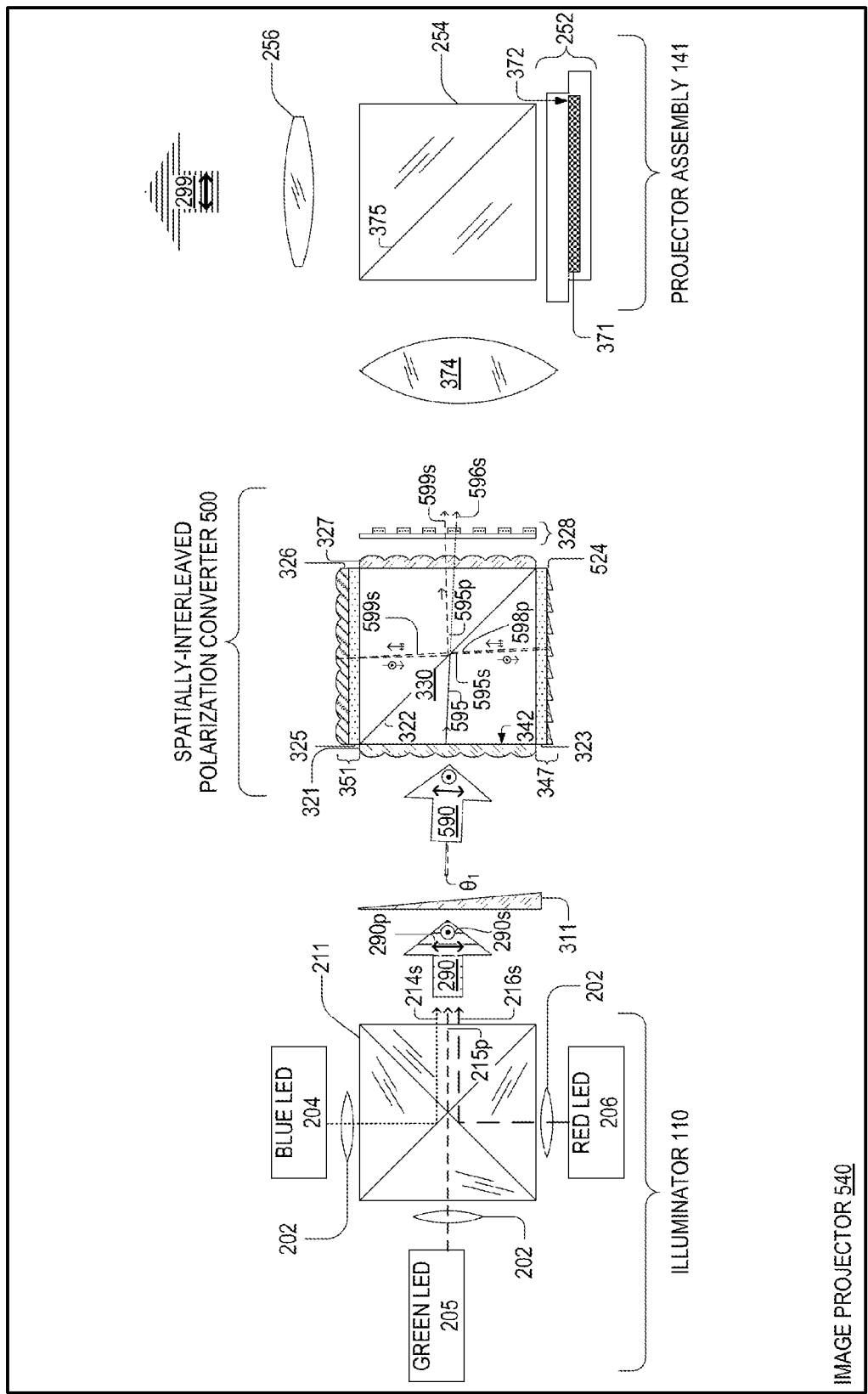
FIG. 5 includes a second illustrative example of spatially-interleaved polarization converter operating within an image projector, in an embodiment.

FIG. 5 is a cross-sectional view of an exemplary image projector 540 that includes a spatially-interleaved polarization converter 500 between illuminator 110 and a projector assembly 141. Image projector 540 and spatially-interleaved polarization converter 500 may are embodiments of image projector 140 and polarization converter 100, respectively. Spatially-interleaved polarization converter 500 is similar to spatially-interleaved polarization converter 300, except that a planar-mirror array 524 replaces mirror array 324. Planar-mirror array 524 may include a plurality of prisms with a reflective coating thereon. For example, planar-minor array 524 may include a plurality of prisms 564 each with a reflective surface 574.

Spatially-interleaved polarization converter 500 also includes components of spatially-interleaved polarization converter 300: PBS cube 330, lenslet array 321 and 327, quarter-wave retarders 323 and 325, mirror array 326, and a half-wave retarder array 328. Quarter-wave retarder 323 and planar-mirror array 524 form a double-pass quarter-wave-plate 547.

Figure 6:
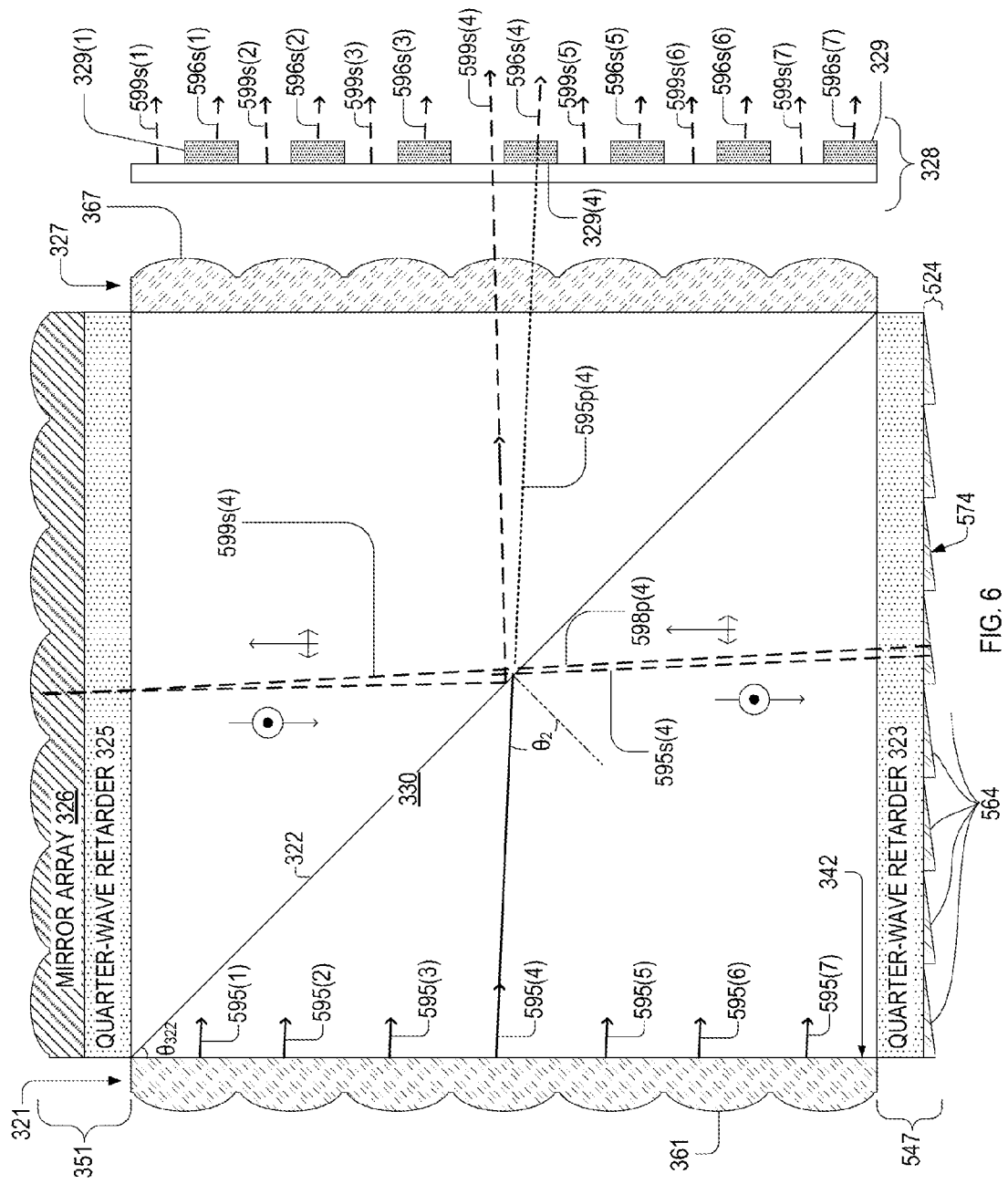
FIG. 6 shows an enlarged view of the polarization converter of FIG. 5.

FIG. 5 includes an illustrative example of spatially-interleaved polarization converter 500 operating within image projector 540. FIG. 6 shows an enlarged view of spatially-interleaved polarization converter 500. FIGS. 5 and 6 are best viewed together in the following description.

Input lenslet array 321 transmits an incident beam 590 as a plurality of beamlets 595(1-7) corresponding to a respective lens of input lenslet array 321. For clarity of illustration, FIGS. 5 and 6 show one of beamlets 595(1-7), beamlet 595(4), propagating through spatially-interleaved polarization converter 500. Beamlets 595 are incident on beam-splitting element 322 at an incident angle $\theta_2 \neq 45°$ with respect to normal, as shown in FIG. 6.

In FIGS. 5 and 6, beam-splitting element 322 intersects surface 342 at an angle $\theta_{322} = 45°$, and incident angle $\theta_2$ of beamlet 595 results from an incident beam 590 being at non-normal incidence ($\theta_1 \neq 0°$) with respect to a surface 342 of PBS cube 330. In FIG. 5, a wedge prism 311 steers and transmits incident beam 390 as incident beam 590 having incident angle $\theta_1$. Alternatively, output beam 290 may be steered to have incident angle $\theta_1$ with respect to surface 342 by changing the relative orientations of illuminator 110 and spatially-interleaved polarization converter 500. In a different embodiment of spatially-interleaved polarization converter 500, angle $\theta_{322} \neq 45°$ such that incident angle $\theta_2 \neq 45°$ when $\theta_1 = 0°$.

Beamlets 595 each include both an s-polarization component and a p-polarization component. In response to beamlets 595(1-7) incident on beam-splitting element 322, spatially-interleaved polarization converter 500 outputs respective first s-polarized output beamlets 596s(1-7) and second s-polarized output beamlets 599s(1-7), as shown in FIG. 6. For example, s-polarized beamlets 596s(4) and 599s(4) are formed from beamlet 595(4).

Neglecting losses due to absorption and scattering from optical components that constitute spatially-interleaved polarization converter 500, beamlets 596s and 599s collectively include all of the electromagnetic energy of beamlet 595.

The following describes how spatially-interleaved polarization converter 500 converts input beamlets 595(1-7) to output beamlets 596s(1-7) and 599s(1-7), input beamlet 595(4) being an illustrative example. Beam-splitting element 322 splits beamlet 595 into a p-polarized transmitted beamlet 595p, and an s-polarized reflected beamlet 595s(4). Beamlet 595p(4) propagates through output lenslet array 327 and half-wave retarder 329(4), which rotates the polarization of beamlet 595p(4) such that half-wave retarder 329(4) transmits an s-polarized beamlet 596s(4). Beamlet 595s(4) becomes a p-polarized beamlet 598p(4) after a double-pass through quarter-wave retarder 323, and a reflection from planar-minor array 524. Beamlet 598p(4) becomes an s-polarized beamlet 599s(4) after a double-pass through quarter-wave retarder 325, and a reflection from mirror array 326. Beamlet 599s(4) is incident on beam-splitting element 322, which reflects beamlet 599s(4) through output lenslet array 327 and between adjacent half-wave retarders 329. In the embodiment of spatially-interleaved polarization converter 500 shown in FIGS. 5 and 6, $\theta_1 \neq 0°$ such that output beamlets 596s and 599s do not co-propagate, and output beamlet 596s does not propagate through any half-wave retarder 329.

In the embodiments of spatially-interleaved polarization converters 300 and 500 shown in FIGS. 4, and 6, respectively, double-pass through quarter-wave retarders 347 and 351 are positioned opposite each other, with PBS cube 330 therebetween. Without departing from the scope hereof, embodiments of spatially-interleaved polarization converters 300 and 500 may be configured such that double-pass through quarter-wave retarders 347 and 351 are not positioned opposite each other.

Figure 7:
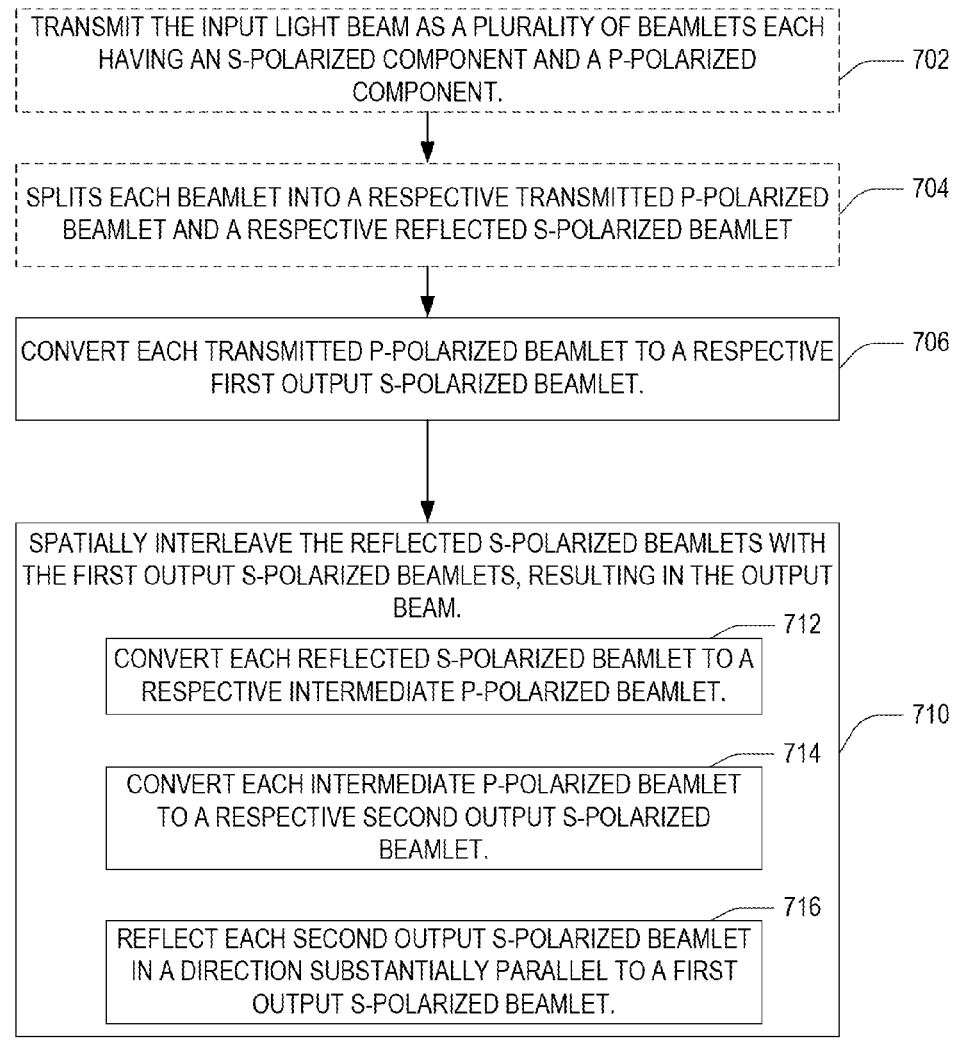
FIG. 7 is a flowchart illustrating a method for converting an input light beam to an output light beam having a single common polarization state, in an embodiment.

FIG. 7 is a flowchart illustrating an exemplary method 700 for converting an input light beam to an output light beam having a single common polarization state. In step 702, method 700 transmits the input light beam as a plurality of beamlets each having an s-polarized component and a p-polarized component. In an example of step 702, input lenslet array 321 transmits incident beam 390 as a plurality of beamlets 395 that each have an s-polarized component and a p-polarized component.

In step 704, method 700 splits each beamlet into a respective transmitted p-polarized beamlet and a respective reflected s-polarized beamlet. In an example of step 704, beam-splitting element 322 splits each beamlet 395 into one respective transmitted p-polarized beamlet 395$p$ and one respective reflected s-polarized beamlet 395$s$.

In step 706, method 700 converts each transmitted p-polarized beamlet to a respective first s-polarized output beamlet. In an example of step 706, half-wave retarder array 328 converts each p-polarized beamlet 395$p$ to a respective first s-polarized output beamlet 396$s$.

In step 710, method 700 spatially interleaves the reflected s-polarized beamlets with the first s-polarized output beamlets, resulting in the output beam. In an example of step 710, double-pass quarter-wave retarders 351 and beam-splitting element 322 interleaves s-polarized beamlets 395$s$ with the first s-polarized output beamlets 396$s$.

In an embodiment of method 700, step 710 includes steps 712, 714, and 716. In step 712, method 700 converts each reflected s-polarized beamlet to a respective intermediate p-polarized beamlet. In step 714, method 700 converts each intermediate p-polarized beamlet to a respective second s-polarized output beamlet. In step 716, method 700 reflects each second s-polarized output beamlet in a direction substantially parallel to a first s-polarized output beamlet. In an example of step 710 that includes steps 712, 714, and 716, double-pass quarter-wave retarder 347 converts each s-polarized beamlet 395$s$ to a respective intermediate p-polarized beamlet 398$p$, double-pass quarter-wave retarder 351 converts each intermediate p-polarized beamlet 398$p$ to a respective second s-polarized output beamlet 399$s$, and beam-splitting element 322 reflects each second s-polarized output beamlet 399$s$ in a direction substantially parallel to a first s-polarized output beamlet 396$s$.

Figure 8:
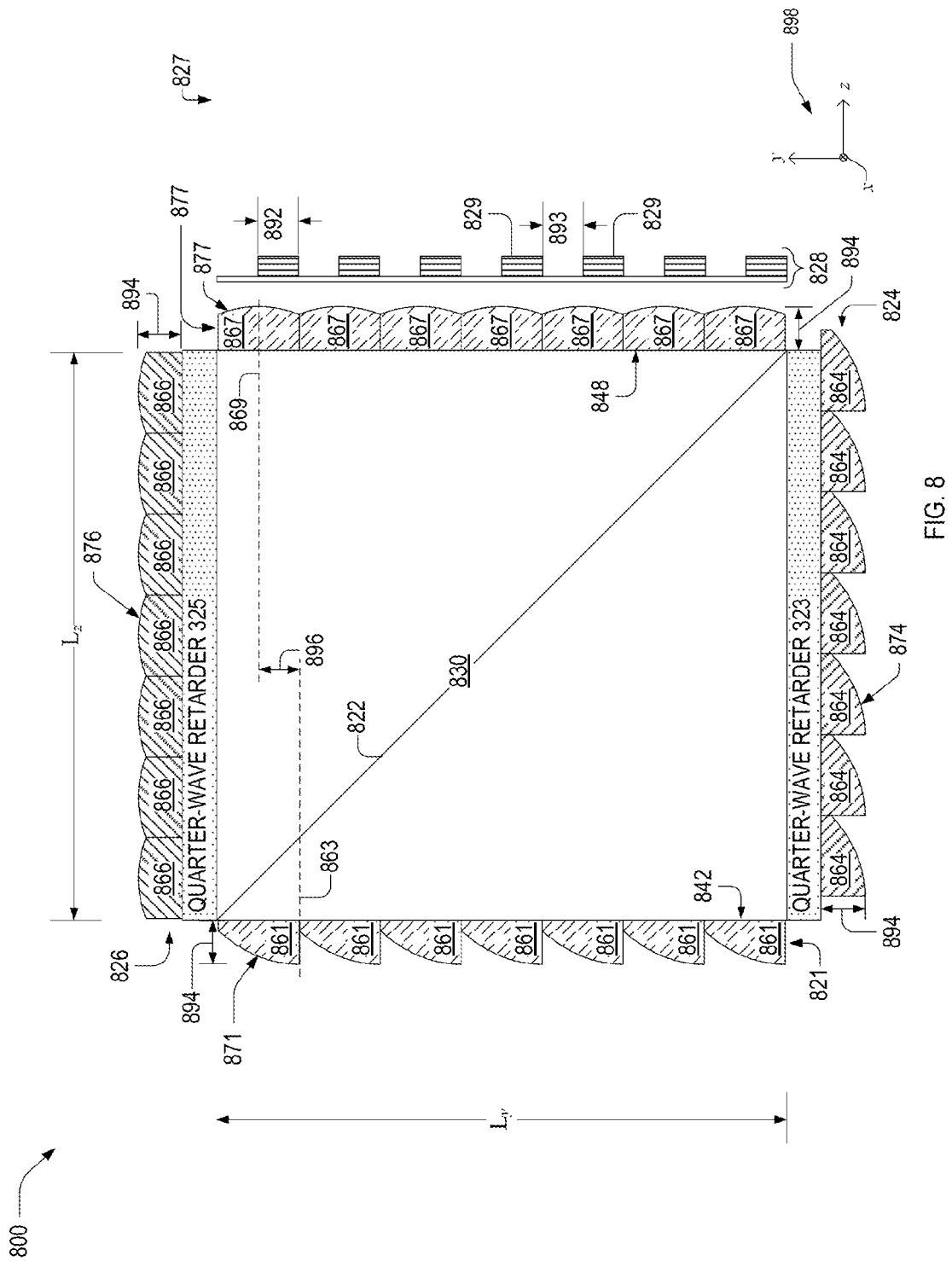
FIG. 8 is a cross-sectional view of an exemplary spatially-interleaved polarization converter, in an embodiment.

FIG. 8 is a cross-sectional view of a spatially-interleaved polarization converter 800. Spatially-interleaved polarization converter 800 is an exemplary embodiment of spatially-interleaved polarization converter 300. Spatially-interleaved polarization converter 800 includes a PBS cube 830, an input lenslet array 821, an output lenslet array 827, a decentered-mirror array 824, a mirror array 826, and a half-wave retarder array 828, which are similar to PBS cube 330, lenslet array 321, lenslet array 327, mirror array 324, and mirror array 326, and half-wave retarder array 328 of spatially-interleaved polarization converter 300, respectively.

Elements of spatially-interleaved polarization converter 800 have the following dimensions and specifications. PBS cube 830 has side lengths $L_x=L_y=L_z=10$ mm and may be formed of a material, such Schott N-SF57 glass, that has a refractive index of n=1.85 at free-space wavelength $\lambda_0=525$ nm. PBS cube 830 includes a beam-splitting element 822, which is similar to beam-splitting element 322. Half-wave retarder array 828 includes a plurality of noncontiguous wave retarders 829. Adjacent half-wave retarders 829 are separated by a gap 893. Each half-wave retarder 829 has a side length $L_x$ in the x direction and a height 892 equal to 0.71 mm in the y direction, where x, y and z are directions of coordinate axes 898 and the x axis is perpendicular to the z-y plane.

Lenslet arrays 821 and 827 are each a contiguous array of decentered input lenslets 861 and output lenslets 867, respectively. Decentered-mirror array 824 and mirror array 826 are each a contiguous array of decentered mirrors 864 and mirrors 866, respectively. Lenslet arrays 821 and 827 may be formed of a material, such as polymethyl methacrylate (PMMA), that has a refractive index of n=1.49 at free-space wavelength $\lambda_0=525$ nm. Mirror array 826 may be formed of a lenslet array, formed of PMMA for example, with reflective coating thereon. Decentered-mirror array 824 may be replaced with planar-mirror array 524 without departing from the scope hereof.

Figure 9:
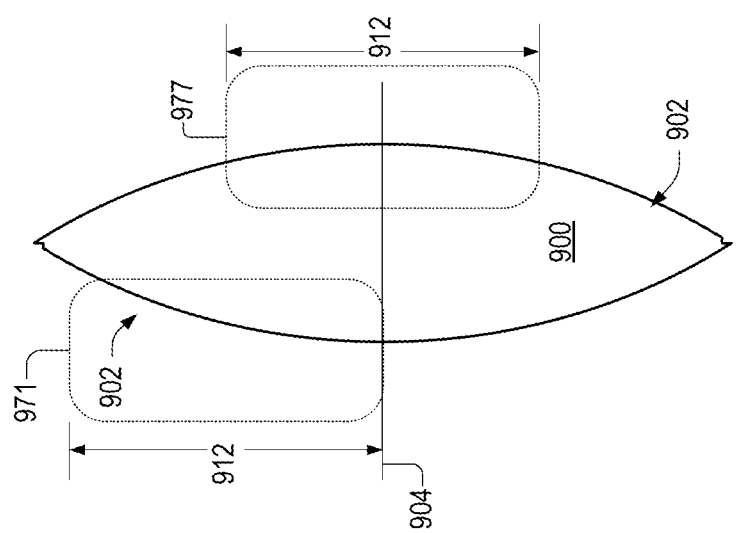
FIG. 9 is a cross-sectional view of a convex lens with surfaces having a same shape as surfaces of lenslets of the polarization converter of FIG. 8, in an embodiment.

Lenslets 861 and 867 and mirrors 864 and 866 each have a thickness 894 equal to 0.5 mm. Each lenslet 861 and lenslet 867 has a 6.5-mm free-space focal length (and a corresponding 6.0-mm back focal length), at free-space wavelength $\lambda_0=525$ nm. Each mirror 864 and 866 has a 3.0-mm free-space focal length at free-space wavelength $\lambda_0=525$ nm Lenslets 861 and 867 have a respective curved surface 871 and 877 that are each portions of a surface 902 of a biconvex shape 900 shown in FIG. 9. Surface 902 has a radius of curvature $R_9=3.16$ mm and a conic constant $C_9=-0.42$. Boxes 971 and 977 include an optical axis 904 of biconvex shape 900. Box 971 has a height 912 and encloses portions of surface 902 corresponding to curved surfaces 871. Box 977 has height 912 and encloses portions of surface 902 corresponding to curved surfaces 877.

Figure 10:
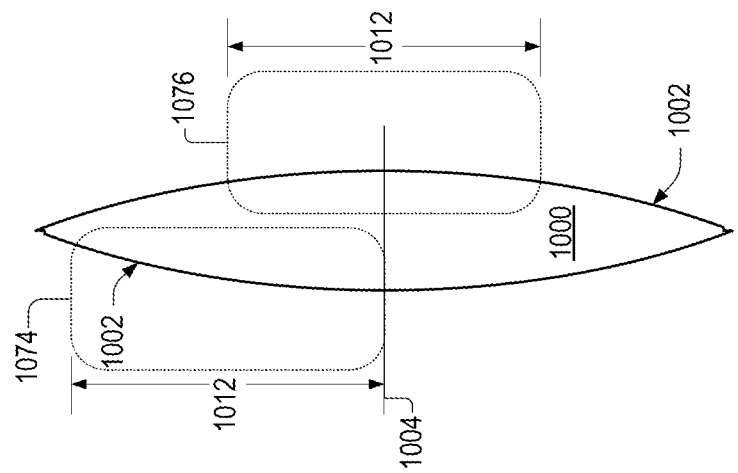
FIG. 10 is a cross-sectional view of a convex lens with surfaces having a same shape as surfaces of concave mirrors of the polarization converter of FIG. 8, in an embodiment.

Mirrors 864 and 866 have a respective curved surface 874, and 876 that are each portions of a surface 1002 of a biconvex shape 1000 shown in FIG. 10. Surface 1002 has radius of curvature $R_{10}=9.0$ mm and a conic constant $C_{10}=0.30$. Boxes 1074 and 1076 include an optical axis 1004 of biconvex shape 1000. Box 1074 has a height 1012 and encloses portions of surface 1002 corresponding to curved surfaces 874. Box 1076 has height 1012 and encloses portions of surface 1002 corresponding to curved surfaces 876. Height 1012 may equal height 912. In an embodiment of spatially-interleaved polarization converter 800, at least one of (a) radius of curvature $R_9$ equals radius of curvature $R_{10}$ and (b) conic constant $C_9$ equals conic constant $C_{10}$.

Referring to FIG. 8, an optical axis 863 of each decentered input lenslet 861 is offset in the y direction from an optical axis 869 of one corresponding output lenslet 867 by a decenter distance 896 equal to 0.71 mm. In an embodiment, optical axes 863 are mutually parallel, optical axes 869 are mutually parallel, and each optical axis 863 is parallel to each optical axis 869. Optical axes 863 may be orthogonal to a surface 842 of PBS cube 830. Optical axes 869 may be orthogonal to a surface 848 of PBS cube 830.

Figure 12:
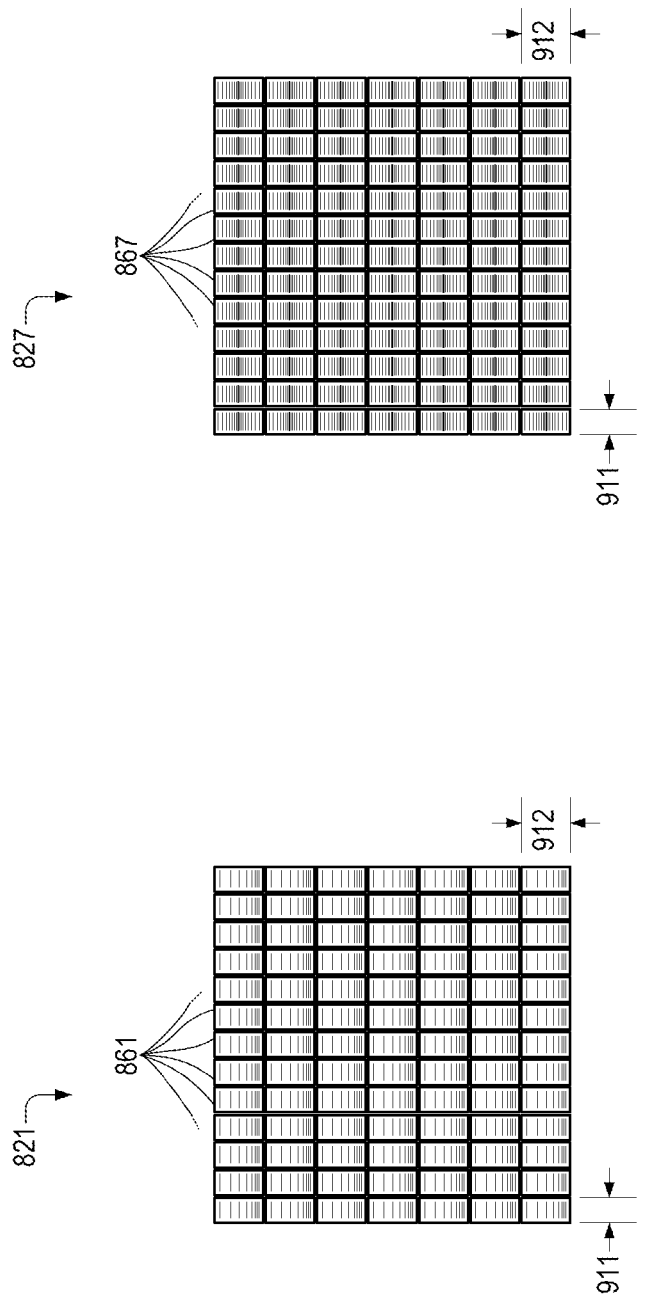
FIG. 12 is a plan view of the output lenslet array of spatially-interleaved polarization converter of FIG. 8, in an embodiment.
Figure 11:
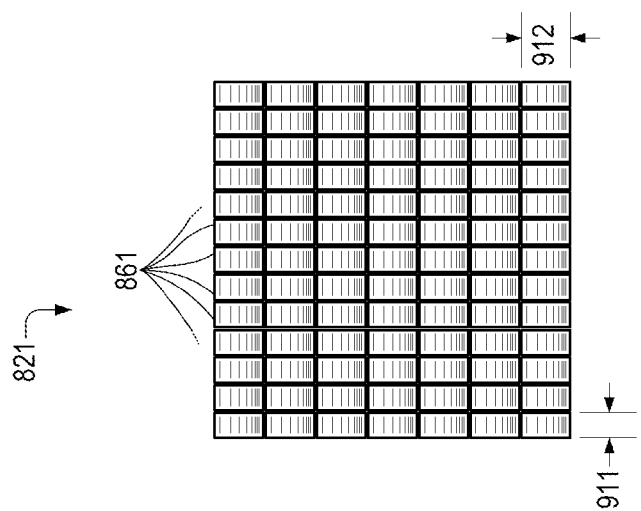
FIG. 11 is a plan view of the input lenslet array of spatially-interleaved polarization converter of FIG. 8, in an embodiment.

FIG. 11 is a plan view of input lenslet array 821 in a plane parallel to the x-y plane of coordinate axes 898. FIG. 12 is a plan view of output lenslet array 827 in a plane parallel to the x-y plane of coordinate axes 898. Lenslet arrays 821 and 827 each include ninety-one lenslets 861 and ninety-one lenslets 867, respectively, arranged in a thirteen by seven array.

Each input lenslet 861 and output lenslet 867 has the following transverse dimensions: height 912=1.42 mm and a width 911=0.8 mm. One or both of mirrors 864 and mirrors 866 may have the same transverse dimensions as lenslets 861 and 867. These transverse dimensions correspond to an aspect ratio of 16:9. This aspect ratio may correspond to one or both of (a) the aspect ratio of pixels of pixel array 371, and (b) the aspect ratio of pixel array 371, in which case pixel array 371 may be a Wide Super Video Graphics Array (WSVGA) display. Within each lenslet array 821 and 827, a sub-array with dimensions M×M, where M is less than or equal to seven, also has an aspect ratio equal to the aspect ratio of pixel array 371.

Figure 13:
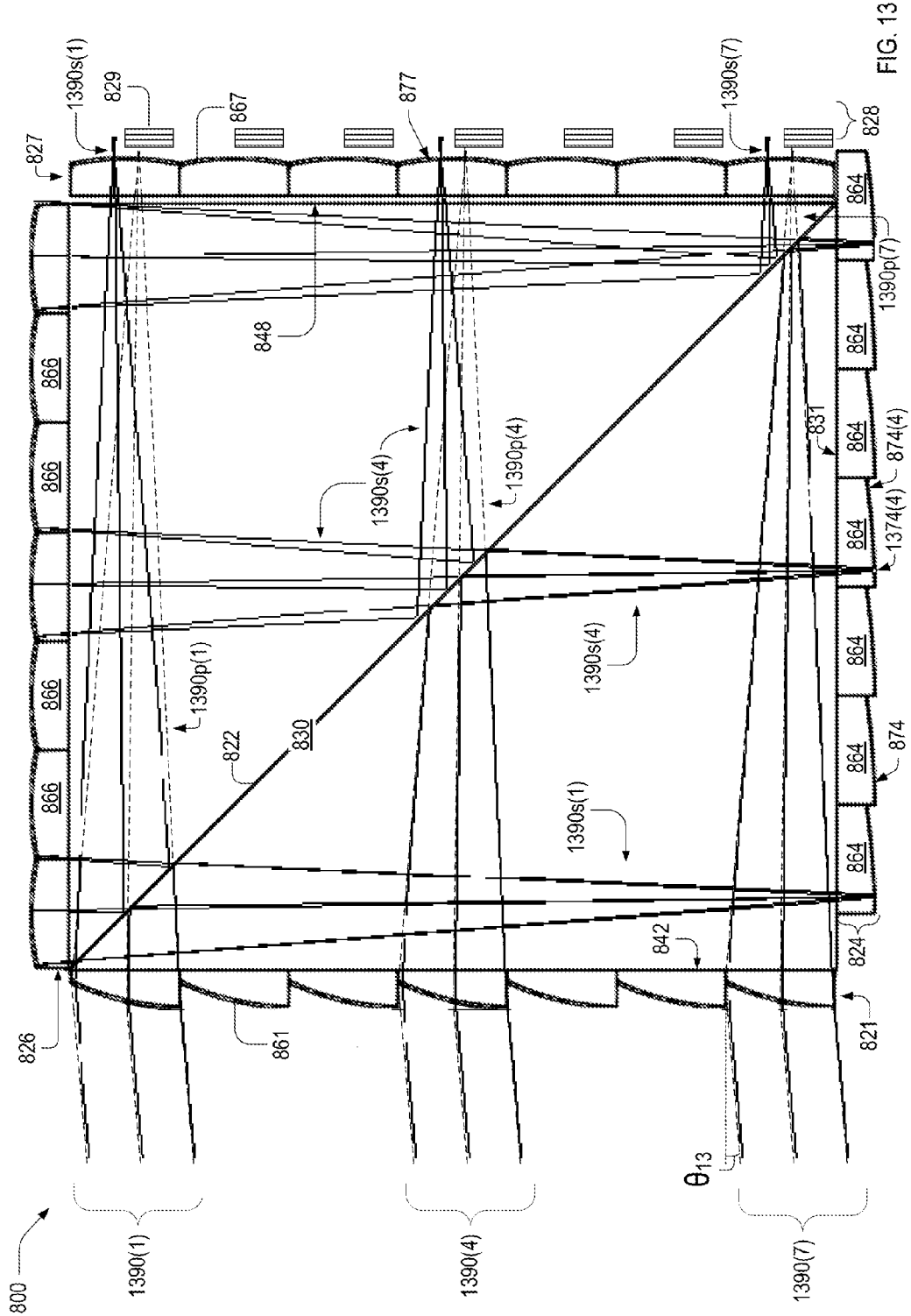
FIG. 13 is an exemplary ray trace through the spatially-interleaved polarization converter of FIG. 8.

FIG. 13 is a cross-sectional view of spatially-interleaved polarization converter 800 with rays 1390 traced therethrough with Zemax®. Refraction angles at material interfaces are computed based on respective material refractive indices at free-space wavelength $\lambda_0$=525 nm. Input rays 1390 are incident on spatially-interleaved polarization converter 800 at an angle $\theta_{13}$=5° with respect to normal incidence on surface 842. It should be appreciated that paths of rays 1390 through spatially-interleaved polarization converter 800 depend on aforementioned geometric and optical properties of spatially-interleaved polarization converter 800, and changes to said properties result in changes to the paths.

For clarity of illustration FIG. 13 includes three sets in input rays, rays 1390(1), 1390(4), and 1390(7), rather than input rays through each input lenslet 861. Beam-splitting element 822 transmits respective p-polarized components of incident rays 1390(1), 1390(4), and 1390(7) as p-polarized rays 1390p(1), 1390p(4), and 1390p(7) respectively, which propagate through a respective output lenslet 867 and one respective half-wave retarder 829.

Beam-splitting element 822 reflects respective s-polarized rays 1390(1), 1390(4), and 1390(7) as rays 1390s(1), 1390s(4), and 1390s(7) respectively. Each ray 1390s reflects off of one decentered mirror 864 of decentered-mirror array 824, toward a mirror 866, and back toward beam-splitting element 822 which reflects each ray 1390s toward a respective output lenslet 867 such that no s-polarized ray 1390s propagates through a half-wave retarder 829.

Input lenslets 861 focus incident rays 1390 such that p-polarized rays 1390p are converging when propagating through surface 848 of PBS cube 830 and converge to a focus at a surface 877 of an output lenslet 867. Input lenslets 861 focus incident rays 1390 such that each s-polarized ray 1390s converges to a focus at a surface 874 of a decentered mirror 864. Mirrors 866 refocus s-polarized rays 1390s such that, after reflection from beam-splitting element 822, each ray 1390s converges to a focus at a surface 877 of an output lenslet 867.

While FIG. 13 does not show quarter-wave retarders 323 and 325, rays 1390s propagate through spatially-interleaved polarization converter 800 as though they are present. Rays 1390 that pass through a common lenslet (rays 1390(4) for example) may converge to a focus before or after exiting a respective output lenslet 867 without departing from the scope hereof.

Figure 14:
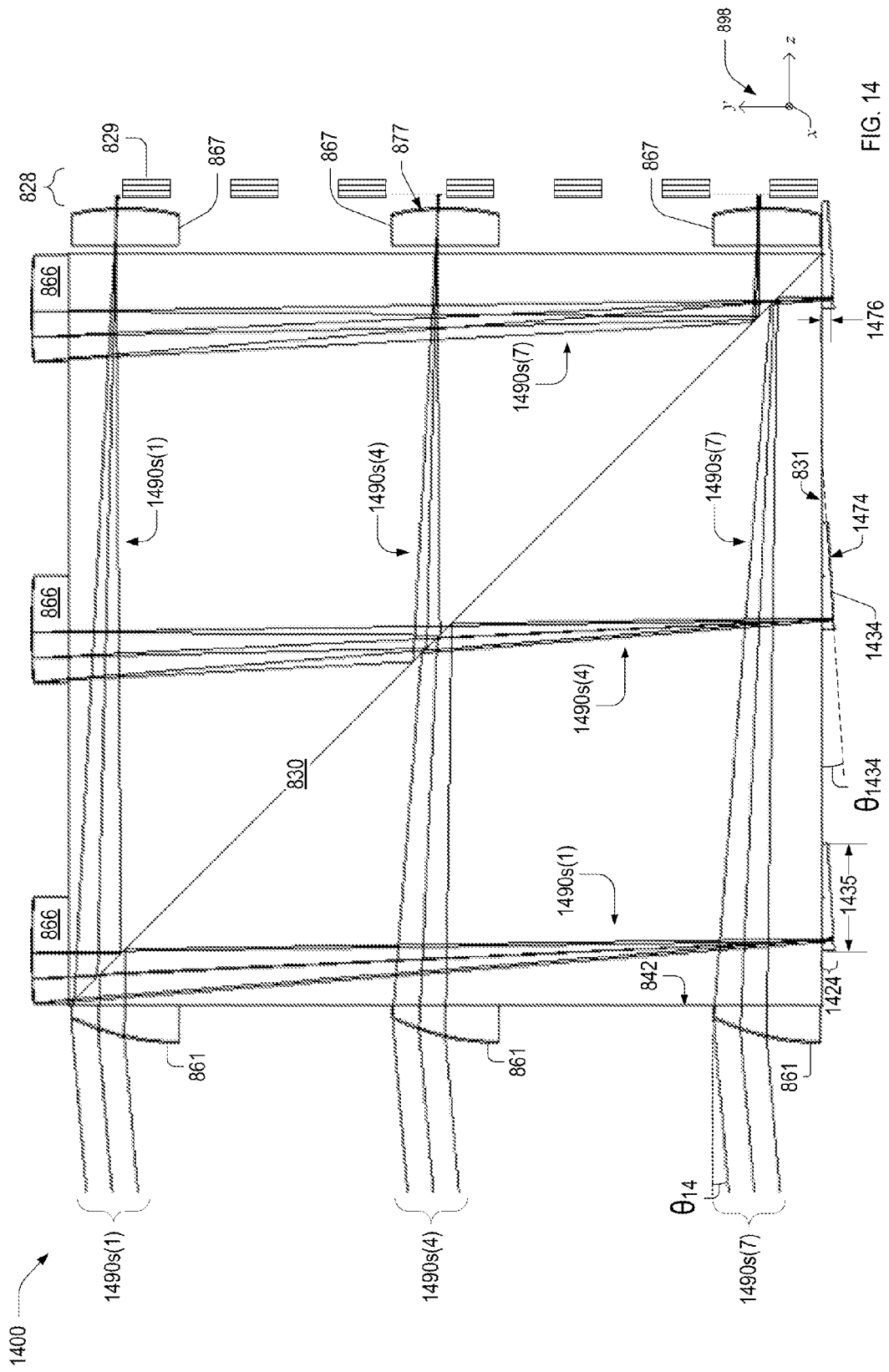
FIG. 14 is an exemplary ray trace through the spatially-interleaved polarization converter of FIG. 8 with reflective planar mirrors replacing selected concave mirrors.

FIG. 14 is a cross-sectional view of a spatially-interleaved polarization converter 1400 with s-polarized rays 1490s traced therethrough with Zemax®. Refraction angles at material interfaces are computed based on respective material refractive indices at free-space wavelength $\lambda_0$=525 nm. Spatially-interleaved polarization converter 1400 is that same as spatially-interleaved polarization converter 800, except that decentered-mirror array 824 is replaced by a planar mirror array 1424 that includes seven reflective prisms 1464. Planar mirror array 1424 is similar to planar mirror array 524, FIG. 5. For clarity of illustration, FIG. 14 shows three of seven decentered input lenslets 861, output lenslets 867, and reflective prisms 1464 corresponding to input rays 1490(1), 1490(4), and 1490(7).

In the embodiment of spatially-interleaved polarization converter 1400 of FIG. 14, each reflective prism 1464 has a base width 1435 equal to 1.42 mm and a reflective surface 1474 that may have a reflective coating thereon. Reflective surface 1474 makes an angle $\theta_{1434}$=3.35° with surface 831 of PBS cube 830. Referring to coordinate axes 898, reflective prisms 1464 may have a length in the x direction, equal to a side length of PBS cube 830, ten millimeters for example. Rays 1490s reflect off a respective reflective surface 1474 at a distance 1476 from surface 831. So long as angle $\theta_{1434}$ and distance 1476 remains constant, spatially-interleaved polarization converter 1400 may include greater than or fewer than seven reflective prisms 1464.

Input rays 1490 are incident on spatially-interleaved polarization converter 1400 at an angle $\theta_{14}$=5° with respect to normal incidence on surface 842. In spatially-interleaved polarization converter 1400, beam-splitting element 822 reflects rays 1490s(1), 1490s(4), and 1490s(7) respectively. Each ray 1490s reflects off of one reflective prism 1464, toward a minor 866, and back toward beam-splitting element 822 which reflects each ray 1490s toward a respective output lenslet 867 such that no s-polarized ray 1490s propagates through a half-wave retarder 829.

Comparing FIG. 13 and FIG. 14 reveals that paths of rays 1390s and 1490s through respective spatially-interleaved polarization converters 800 and 1400 are very similar. That is, the paths of rays 1390s(1), 1390s(4), and 1390s(7) are very similar to that of rays 1490s(1), 1490s(4), and 1490s(7), respectively. Referring to FIG. 13, rays 1390s(4) focus and reflect off at a point 1374(4) on surface 874(4). The similarity of paths taken by rays 1390s and 1490s suggests that a tangent to surface 874(4) at point 1374(4) makes an angle equal to $\theta_{1434}$ with surface 831 of PBS cube 830.

Features described above as well as those claimed below may be combined in various ways without departing from the scope hereof. The following examples illustrate some possible, non-limiting combinations:

(A1) A spatially-interleaved polarization converter may have optical elements including an input lenslet array, a first double-pass quarter-wave retarder, a second double-pass quarter-wave retarder, a polarizing beam splitter (PBS), and a wave-retarder array. The input lenslet array has a plurality of input lenslets with parallel respective lens optical axes. The wave-retarder array has a noncontiguous plurality of half-wave retarders with parallel respective retarder optical axes that are parallel to the lens optical axes. The PBS has a planar beam-splitting element located (a) between the input lenslet array and the wave-retarder array and (b) between the first double-pass quarter-wave retarder and the second double-pass quarter-wave retarder. The optical elements may be configured to convert an input light beam to an output light beam having a plurality of first s-polarized beamlets interleaved with a plurality of second s-polarized beamlets.

(A2) In the spatially-interleaved polarization converter denoted as (A1), the planar beam-splitting element may be the only beam-splitting element of the polarization converter that splits the input light beam.

(A3) Either or both of the spatially-interleaved polarization converters denoted as (A1) and (A2) may further include an output lenslet array between the PBS and the wave-retarder array, the PBS being between the input lenslet array and the output lenslet array.

(A4) In the spatially-interleaved polarization converters denoted as (A3), the input lenslet array and the output lenslet array may oppose one another and may be substantially parallel.

(A5) In either or both of the spatially-interleaved polarization converters denoted as (A3) and (A4), the output lenslet array may have a plurality of output lenslets each having an output lenslet surface. Each input lenslet may have an input lenslet surface; wherein the input lenslet surfaces and output lenslet surfaces each have a same radius of curvature and same conic constant (A6) In any of the spatially-interleaved polarization converters denoted as (A3) through (A5), the PBS may be a PBS cube, the input lenslet may be on a first side of the PBS cube, and the output lenslet array may be on a second side of the PBS cube opposite the first side. The first double-pass quarter-wave retarder may be on a third side of the PBS cube. The second double-pass quarter-wave retarder may be on a fourth side of the PBS cube opposite the third side.

(A7) In any of the spatially-interleaved polarization converters denoted as (A1) through (A6), an input lenslet may lack axial symmetry.

(A8) In any of the spatially-interleaved polarization converters denoted as (A1) through (A7), the planar beam-splitting element may be orientated at angle with respect to the lens optical axes and retarder optical axes, the angle being between 40° and 50°.

(A9) In any of the spatially-interleaved polarization converters denoted as (A1) through (A8), the first and second double-pass quarter-wave retarders may oppose one another, may be substantially parallel, and may he orthogonal to the input lenslet array.

(A10) In any of the spatially-interleaved polarization converters denoted as (A1) through (A9), the first and second double-pass quarter-wave retarders may oppose one another and may be substantially parallel, the PBS being positioned therebetween.

(A11) In any of the spatially-interleaved polarization converters denoted as (A1) through (A10), the optical elements may be configured and arranged to collectively transmit each of the plurality of second s-polarized output beamlets at an angle with respect to a first s-polarized output beamlet not exceeding ten degrees.

(A12) In any of the spatially-interleaved polarization converters denoted as (A1) through (A11), the optical elements may be configured and arranged to collectively transmit each of the plurality of first s-polarized output beamlets at an angle with respect to the input light beam not exceeding ten degrees.

(A13) In any of the spatially-interleaved polarization converters denoted as (A1) through (A11), at least one of the first and second double-pass quarter-wave retarders may include at least one of a planar mirror and a concave mirror.

(B1) An image projector may include (1) a spatially-interleaved polarization converter having optical elements including an input lenslet array and an output lenslet array, and being capable of transmitting incident light thereon as converted light having a single common polarization state, and (2) a projector assembly having a pixel array and being capable of reflecting the converted light. The output lenslet array and the projector assembly may be part of an imaging system that images the input lenslet array to a top surface of the pixel array.

(B2) In the image projector denoted as (B1), the optical elements may further include a first double-pass quarter-wave retarder, a second double-pass quarter-wave retarder, a polarizing beam splitter (PBS), and a wave-retarder array. The input lenslet array has a plurality of input lenslets with parallel respective lens optical axes. The wave-retarder array has a noncontiguous plurality of half-wave retarders with parallel respective retarder optical axes that are parallel to the lens optical axes. The PBS has a planar beam-splitting element located (a) between the input lenslet array and the wave-retarder array and (b) between the first double-pass quarter-wave retarder and the second double-pass quarter-wave retarder. The optical elements may be configured to convert an input light beam to an output light beam having a plurality of first s-polarized beamlets interleaved with a plurality of second s-polarized beamlets.

(B3) In at least one of the image projectors denoted as (B1) and (B2), the imaging system may also include a lens unit between the output lenslet array and the projector assembly.

(B4) Any of the image projectors denoted as (B1) through (B3) may further comprise an illuminator capable of producing the incident light.

(B5) In any of the image projectors denoted as (B1) through (B3), one or both of the input lenslet array and a sub-array of lenslets therein may have an aspect ratio equal to an aspect ratio of the pixel array.

(C1) A method for converting an input light beam having multiple linear polarization states to an output light beam having a single common polarization state may include (a) transmitting the input light beam as a plurality of beamlets each having an s-polarized component and a p-polarized component, (b) splitting each beamlet into a respective transmitted p-polarized beamlet and a respective reflected s-polarized beamlet, (c) converting each transmitted p-polarized beamlet to a respective first s-polarized output beamlet, and (d) spatially interleaving the reflected s-polarized beamlets with the first s-polarized output beamlets, resulting in the output beam.

(C2) In the method denoted as (C1), the step of spatially interleaving may include converting each reflected s-polarized beamlet to a respective intermediate p-polarized beamlet, converting each intermediate p-polarized beamlet to a respective second s-polarized output beamlet; and reflecting each second s-polarized output beamlet in a direction substantially parallel to at least one first s-polarized output beamlet.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A spatially-interleaved polarization converter comprising:
    optical elements including an input lenslet array, a first double-pass quarter-wave retarder, a second double-pass quarter-wave retarder, a polarizing beam splitter (PBS), and a wave-retarder array;
    the input lenslet array having a plurality of input lenslets with parallel respective lens optical axes, the wave-retarder array having a noncontiguous plurality of half-wave retarders with parallel respective retarder optical axes that are parallel to the lens optical axes;

the PBS having a planar beam-splitting element located (a) between the input lenslet array and the wave-retarder array and (b) between the first double-pass quarter-wave retarder and the second double-pass quarter-wave retarder;

the optical elements being configured to convert an input light beam to an output light beam having a plurality of first s-polarized beamlets interleaved with a plurality of second s-polarized beamlets.

2. The polarization converter of claim 1, the planar beam-splitting element being the only beam-splitting element of the polarization converter that splits the input light beam.

3. The polarization converter of claim 1, further comprising an output lenslet array between the PBS and the wave-retarder array, the PBS being between the input lenslet array and the output lenslet array.

4. The polarization converter of claim 3, the input lenslet array and the output lenslet array opposing one another and being substantially parallel.

5. The polarization converter of claim 3, the output lenslet array having a plurality of output lenslets each having an output lenslet surface; each input lenslet having an input lenslet surface; wherein the input lenslet surfaces and output lenslet surfaces each have a same radius of curvature and same conic constant.

6. The polarization converter of claim 3, the PBS being a PBS cube, the input lenslet array being on a first side of the PBS cube, the output lenslet array being on a second side of the PBS cube opposite the first side, the first double-pass quarter-wave retarder being on a third side of the PBS cube, and the second double-pass quarter-wave retarder being on a fourth side of the PBS cube opposite the third side.

7. The polarization converter of claim 1, an input lenslet lacking axial symmetry.

8. The polarization converter of claim 1, the planar beam-splitting element being orientated at angle with respect to the lens optical axes and retarder optical axes, the angle being between 40° and 50°.

9. The polarization converter of claim 1, the first and second double-pass quarter-wave retarders opposing one another and being substantially parallel, and being orthogonal to the input lenslet array.

10. The polarization converter of claim 1, the first and second double-pass quarter-wave retarders opposing one another and being substantially parallel, the PBS being positioned therebetween.

11. The polarization converter of claim 1, the optical elements being configured and arranged to collectively transmit each of the plurality of second s-polarized output beamlets at an angle with respect to a first s-polarized output beamlet not exceeding ten degrees.

12. The polarization converter of claim 1, the optical elements being configured and arranged to collectively transmit each of the plurality of first s-polarized output beamlets at an angle with respect to the input light beam not exceeding ten degrees.

13. The polarization converter of claim 1, at least one of the first and second double-pass quarter-wave retarders including at least one of a planar mirror and a concave mirror.

14. An image projector comprising:
a spatially-interleaved polarization converter having optical elements including an input lenslet array and an output lenslet array, and being capable of transmitting incident light thereon as converted light having a single common polarization state; and
a projector assembly having a pixel array and being capable of reflecting the converted light;
the output lenslet array and the projector assembly being part of an imaging system that images the input lenslet array to a top surface of the pixel array.

15. The image projector of claim 14:
the optical elements further including a first double-pass quarter-wave retarder, a second double-pass quarter-wave retarder, a polarizing beam splitter (PBS), and a wave-retarder array;
the input lenslet array having a plurality of input lenslets with parallel respective lens optical axes, the wave-retarder array having a noncontiguous plurality of half-wave retarders with parallel respective retarder optical axes that are parallel to the lens optical axes;
the PBS having a planar beam-splitting element located (a) between the input lenslet array and the wave-retarder array and (b) between the first double-pass quarter-wave retarder and the second double-pass quarter-wave retarder; and
the optical elements being configured to convert an input light beam to an output light beam having a plurality of first s-polarized beamlets interleaved with a plurality of second s-polarized beamlets.

16. The image projector of claim 14, the imaging system further comprising a lens unit between the output lenslet array and the projector assembly.

17. The image projector of claim 14, further comprising an illuminator capable of producing the incident light.

18. The image projector of claim 14, one or both of the input lenslet array and a sub-array of lenslets therein having an aspect ratio equal to an aspect ratio of the pixel array.

19. A method for converting an input light beam having multiple linear polarization states to an output light beam having a single common polarization state comprising:
transmitting the input light beam as a plurality of beamlets each having an s-polarized component and a p-polarized component;
splitting each beamlet into a respective transmitted p-polarized beamlet and a respective reflected s-polarized beamlet;
converting each transmitted p-polarized beamlet to a respective first s-polarized output beamlet; and
spatially interleaving the reflected s-polarized beamlets with the first s-polarized output beamlets, resulting in the output beam.

20. The method of claim 19, the step of spatially interleaving comprising:
converting each reflected s-polarized beamlet to a respective intermediate p-polarized beamlet;
converting each intermediate p-polarized beamlet to a respective second s-polarized output beamlet; and
reflecting each second s-polarized output beamlet in a direction substantially parallel to at least one first s-polarized output beamlet.

* * * * *

UNITED STATES PATENT AND TRADEMARK OFFICE
CERTIFICATE OF CORRECTION

PATENT NO. : 9,448,415 B2  
APPLICATION NO. : 14/631513  
DATED : September 20, 2016  
INVENTOR(S) : Yi-Wei Liu Page 1 of 1

It is certified that error appears in the above-identified patent and that said Letters Patent is hereby corrected as shown below:

On the Title Page

And in the Specification Column 1, Line 1, "Spatially Interleaved" should read -- Spatially-Interleaved --;

In the Specification

Column 4, Line 66, "$\theta_{312}=45°$" should read -- $\theta_{322}=45°$ --;
Column 10, Line 26, "minor" should read -- mirror --.

Signed and Sealed this
Thirteenth Day of March, 2018

Andrei Iancu
*Director of the United States Patent and Trademark Office*